# 2,706,198

BENZHYDRYL ETHERS OF TROPINE AND PROCESSES OF PREPARATION

John Weijlard, Maplewood, N. J., assignor to Merck & Co., Inc., Rahway, N. J., a corporation of New Jersey No Drawing. Application March 29, 1952, Serial No. 279,475

6 Claims. (Cl. 260—292)

This invention relates to tropine benzohydryl ethers; more particularly it is concerned with a novel process for the preparation of tropine benzohydryl ethers and acid salts thereof.

The copending application, Serial No. 76,183, filed February 12, 1949, now United States Patent No. 2,595,405, issued May 6, 1952, describes a process of preparing tropine benzohydryl ether which comprises reacting tropine with diphenyldiazomethane. This method is not particularly satisfactory for the preparation of tropine benzohydryl ether on a commercial scale since the reaction is potentially dangerous in view of the unstable and explosive nature of diphenyldiazomethane. Further, diphenyldiazomethane is not available commercially and must be prepared by processes which are hazardous to carry out on a commercial scale, such as the reaction of benzophenone hydrazone with yellow mercuric oxide in petroleum ether. Thus, a more satisfactory method of preparing tropine benzohydryl ether has been sought.

The object of this invention is to provide a process for the preparation of tropine benzohydryl ethers which can be readily and conveniently carried out on a commercial scale and will avoid the hazards involved in the use of diphenyldiazomethane. Other objects of the invention will be apparent from the detailed description hereinafter provided.

In accordance with my invention, the desideratum is achieved by intimately contacting tropine with a diphenylhalomethane in an acidic medium to form the desired tropine benzohydryl ether. Thus, the reaction for the preparation of tropine benzohydryl ether may be shown as follows:

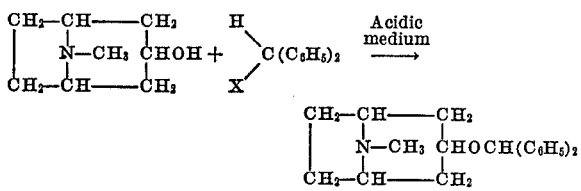

wherein X represents a halogen.

Similarly, substituted diphenylhalomethanes may be reacted with tropine in an acidic medium in place of diphenylhalomethane to obtain the corresponding substituted tropine benzohydryl ethers. Thus, diphenylhalomethanes of the formula

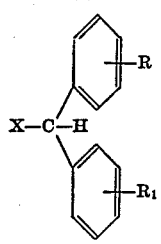

wherein X is a halogen and R and R₁ are nuclear phenyl substituents from the group consisting of hydrogen, halogen, lower alkoxy and lower alkyl, can be reacted with tropine to obtain the corresponding tropine benzohydryl ethers. Suitable starting materials that might be mentioned include 4-chlorodiphenylbromomethane, 4,4'-dichlorodiphenylchloromethane, 4-methyldiphenylbromomethane, 4,4'-dimethyldiphenylbromomethane, 4-methoxydiphenyliodomethane, 4,4'-dimethoxydiphenylbromomethane, 4-ethyldiphenylbromomethane, 4,4'-diethoxydiphenylchloromethane, 4'-propyldiphenylbromomethane, 2-ethoxydiphenylchloromethane, 2,2'-dipropoxydiphenylbromomethane, 3-methyldiphenylbromomethane, 3,3'-dimethoxydiphenylbromomethane, 2,2'-dichlorodiphenylbromomethane, 3-bromodiphenylbromomethane, 3,3'-diiododiphenylbromomethane, and the like.

In effecting this condensation, I find that it is most conveniently accomplished by dissolving the tropine in a suitable acidic medium, adding the diphenylhalomethane thereto, and permitting the reaction medium to stand at room temperature for sufficient time to complete the reaction. The lower aliphatic carboxylic acids, and in particular acetic acid which is inexpensive and readily available, are especially suitable as acidic reaction mediums for carrying out this condensation. Although any of the diphenylhalomethanes may be employed in my process, I have found the bromomethanes to be particularly satisfactory in this reaction and most readily prepared. Diphenylbromomethane is available commercially or it may be readily prepared as described in Berichte, 43, 2940 (1910) or Ann., 442, 245 (1925).

Thus, in accordance with a preferred embodiment of my invention, the process of my invention is effected by adding an amount of a diphenylbromomethane slightly in excess of the quantity theoretically necessary, to a solution of tropine dissolved in glacial acetic acid obtained by warming the tropine in glacial acetic acid to effect solution and then cooling the solution to about 20° C. The resulting reaction mixture is allowed to stand at room temperature with occasional stirring to permit the condensation of the reactants. Generally, I find it desirable to allow the reaction mixture to stand for about four days or more to achieve maximum yields under optimum conditions. Further, I find it preferable to carry out the reaction at room temperature although higher temperatures up to about 90° C. may also be employed. Temperatures in excess of about 90° C. are usually undesirable since I find that higher temperatures result in decreased yields of the desired product.

The use of an acidic solvent in effecting the condensation appears to be necessary in order to avoid the formation of undesirable quaternary ammonium compounds since the use of neutral solvents such as ether or benzene results in the formation of the quaternary ammonium compound in almost quantitative yield.

Various methods can be utilized to recover the formed tropine benzohydryl ether from the reaction mixture after the condensation is completed. I have found that this is most conveniently accomplished by isolating the desired product as the hydrobromide salt. This can be readily accomplished by adding water, ether and finally an aqueous solution of hydrobromic acid to the reaction mixture containing the tropine benzohydryl ether. The product is precipitated as the hydrobromide salt by the addition of water, ether and an aqueous solution of the hydrobromic acid, and may be recovered by filtration. If desired, the product so obtained can be further purified by recrystallization from a suitable solvent such as ethyl alcohol.

The acid salts of the tropine benzohydryl ethers have anti-histamine and atropine-like activity. These salts may be readily converted to tropine benzohydryl ether methane sulfonates which are very soluble in water and also possess anti-histamine and atropine-like activity by methods known in the art.

The following examples are presented to illustrate the novel process of my invention.

Example 1

Tropine base was first prepared by dissolving 450 g. of tropine hydrochloride in 1800 cc. of 30% sodium hydroxide and extracting the resulting solution with chloroform. The combined chloroform extracts were then dried, filtered, washed and concentrated to a syrup and the resulting syrup distilled in vacuum at 115–119° C. at 8 mm. pressure.

To a solution of 21.1 g. (0.15 mole) of distilled tropine base dissolved in 75 cc. of glacial acetic acid by warming and then cooling the solution to 20° C. was added 40 g. (0.16 mole) of diphenylbromomethane. The resulting mixture was allowed to stand for 96 hours at room temperature and agitated by stirring once or twice a day.

To the reaction mixture was added 300 cc. of ether and 300 cc. of water followed by 25 cc. of 40% hydrobromic acid. The resulting mixture was agitated vigorously and allowed to stand an hour at room temperature. The precipitated tropine benzohydryl ether hydrobromide was then removed by filtration and the product washed with 4 x 50 cc. of ether, and then 4 x 50 cc. of water, and the resulting crude product air dried at 45–50° C. The yield of tropine benzohydryl ether hydrobromide was 39.3 g. (67.5% theory). The product had a melting point of 241–243° C. and a mixed melting point with a known sample of tropine benzohydryl ether hydrobromide was not depressed.

The crude tropine benzohydryl ether hydrobromide so obtained was purified by suspending 62 g. of the crude product in 620 cc. of alcohol, heating the resulting solution to boiling, and then cooling to 0° C. The precipitated tropine benzohydryl ether hydrobromide was then filtered off, washed with 2 x 50 cc. of ice cold alcohol and air dried at 45–50° C. The product so obtained was found to melt at 250–251° C. *Analysis.*—Calc'd. for $C_{21}H_{26}ONBr$: C, 64.95; H, 6.75; N, 3.60. Found: C, 64.74; H, 6.63; N, 3.61.

*Example 2*

Additional experiments were carried out as described in Example 1 to determine the effect of the time of reaction upon the yield of product. The following table shows the yield of tropine benzohydryl ether hydrobromide obtained for the various reaction times indicated:

| Time, hours | 20 | 44 | 96 | 168 |
|---|---|---|---|---|
| Yield, percent | 22 | 31 | 67.5 | 71 |

*Example 3*

To a solution of 21.1 g. (0.15 mole) of distilled tropine base in 75 cc. of glacial acetic acid at 20° C. was added 50.6 g. (0.16 mole) of 4,4'-dichlorodiphenylbromomethane (M. P. 67–69° C.), which may be prepared as described in J. A. C. S. 42, 2091 (1920). The resulting reaction mixture was allowed to stand at room temperature for 113 hours. To this solution was then added 200 cc. of ether precipitating tropine hydrobromide as an oil which soon crystallized to a fine white powder. On recrystallizing this product from ethanol it was found to melt at 264–265.5° C. with decomposition.

The ethereal mother liquors on standing in the refrigerator for about 10 days deposited crystals of tropine 4,4'-dichlorobenzohydryl ether hydrobromide. On recrystallization from hot ethanol the product was found to melt at 242.5–243.5° C. with decomposition.

*Analysis.*—Calculated for $C_{21}H_{24}ONCl_2Br$: C, 55.10; H, 5.30; N, 3.06; Br, 17.4. Found: C, 55.06; H, 5.09; N, 3.28; Br, 17.0.

Various changes and modifications may be made in my invention, certain preferred embodiments of which are herein disclosed, without departing from the scope thereof; to the extent that these changes and modifications are within the scope of the appended claims, they are to be considered as part of my invention.

I claim:

1. The process which comprises reacting tropine with diphenylbromomethane in acetic acid to form tropine benzohydryl ether.

2. The process which comprises reacting tropine with 4,4'-dichlorodiphenylbromomethane in acetic acid to form tropine 4,4'-dichlorobenzohydryl ether.

3. The process which comprises reacting tropine with diphenylbromomethane in a lower aliphatic carboxylic acid to form tropine benzohydryl ether.

4. The process which comprises reacting tropine with 4,4'-dichlorodiphenylbromomethane in a lower aliphatic carboxylic acid to form tropine 4,4'-dichlorobenzohydryl ether.

5. The process which comprises reacting tropine with 4,4'-dichlorodiphenylhalomethane in a lower aliphatic carboxylic acid to form tropine 4,4'-dichlorobenzohydryl ether.

6. The process which comprises reacting a diphenylhalomethane of the formula:

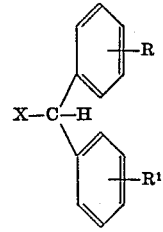

wherein R and $R^1$ are substituents from the group consisting of hydrogen, halogen, lower alkoxy and lower alkyl and X is a halogen with tropine in the presence of a lower aliphatic carboxylic acid to form a tropine benzohydryl ether of the formula:

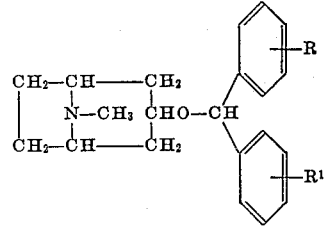

wherein R and $R^1$ are the same as defined above.

References Cited in the file of this patent

UNITED STATES PATENTS

| 2,453,729 | Rieveschl, Jr. | Nov. 16, 1948 |
| 2,454,092 | Rieveschl, Jr. | Nov. 16, 1948 |
| 2,508,499 | Cusic | May 23, 1950 |
| 2,567,350 | Rieveschl, Jr. | Sept. 11, 1951 |
| 2,567,351 | Rieveschl, Jr. | Sept. 11, 1951 |
| 2,595,405 | Phillips | May 6, 1952 |